United States Patent [19]

Schrader et al.

[11] 4,204,612

[45] May 27, 1980

[54] SYSTEM FOR APPLYING FOAM INSULATION

[75] Inventors: Joseph F. Schrader, New Hartford; Phillip C. Szeliga, Sauquoit, both of N.Y.

[73] Assignee: Foam Controls Inc., New Hartford, N.Y.

[21] Appl. No.: 904,877

[22] Filed: May 11, 1978

[51] Int. Cl.² ............................................. B29C 11/00
[52] U.S. Cl. ........................................ 222/40; 222/54; 222/59; 222/135; 222/146 R; 239/61; 239/75; 239/128; 219/421; 264/40.6; 264/46.5; 425/144
[58] Field of Search ................... 222/1, 23, 39, 40, 52, 222/54, 59, 71, 134, 135, 146 R; 239/61, 75, 128; 219/421; 497–499; 264/40.6, 46.5; 137/606; 425/143–144

[56] References Cited

U.S. PATENT DOCUMENTS

| | | | |
|---|---|---|---|
| 3,172,925 | 3/1965 | Preotle | 264/46.5 |
| 3,307,744 | 3/1967 | Burford | 222/54 X |
| 3,540,626 | 11/1970 | Eberle | 222/146 R |
| 3,540,629 | 11/1970 | Ballentine | 222/146 R |
| 3,736,930 | 6/1973 | Georgi | 222/39 X |
| 3,934,756 | 1/1976 | Young et al. | 222/134 X |

FOREIGN PATENT DOCUMENTS 2543447 3/1977 Fed. Rep. of Germany ........... 425/144

Primary Examiner—Joseph J. Rolla

[57] ABSTRACT

A system for applying a foam insulation material which automatically compensates for changes in temperature and flow rates so that an optimum blending of materials can be maintained to provide for the production of high quality insulation.

9 Claims, 9 Drawing Figures

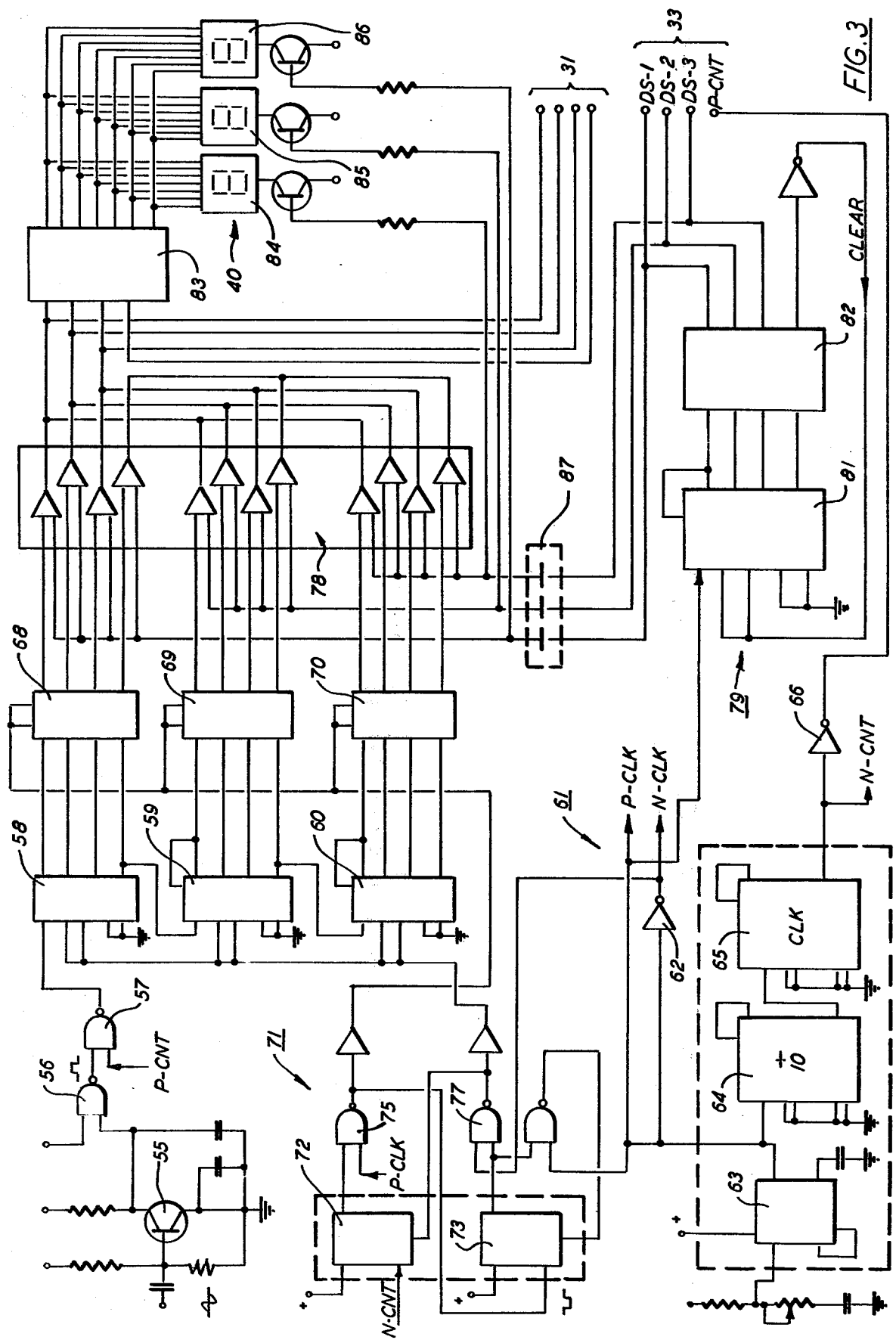

SYSTEM FOR APPLYING FOAM INSULATION

BACKGROUND OF THE INVENTION

This invention relates to a foam insulation system and, in particular, to a system for automatically producing high quality insulation.

Conventionally, in most foam insulation systems, a resin and a foaming agent are brought together within the mixing chamber of an application gun and the mixture is then quickly injected into a wall cavity or the like. Upon entering the cavity, the material, which is a heavy lather, rapidly fills the cavity region and hardens into a uniform structure to provide a thermal and/or acoustical barrier. The time it takes the mixture to gel and the proportions in which the materials are mixed are critical parameters in the application process.

Heretofore, most efforts concerning the proper blending of materials have been directed toward improving the pump that is employed to bring the materials from a supply reservoir to the mixing chamber of the gun. However, it has been found that other factors such as dirt in the lines, the twisting and/or bending of the flexible hoses carrying materials to the gun or even changing the elevation of the gun will also adversely disturb flow rates.

The gel time of the mixture is most prominently affected by temperature. Usually an applicator will prepare his materials based on the manufacturer's recommended values for the air temperature expected at the time of application. However, as is often the case, the actual temperature is seldom the same as the predicted and any variance above or below the predicted value again adversely affects the quality of the insulation. The temperature of the receiving cavity, when different from the material temperature, can also act to reduce the quality of the foam produced.

Heretofore, most applicators of foam insulation have been required to manually monitor their systems in an effort to see that acceptable foam is being applied. These attempts to make manual adjustments result in a good deal of wasted time and oftentimes end in failure. As a consequence, a good deal of defective insulation is manufactured which results in the wasting of valuable energy.

SUMMARY OF THE INVENTION

It is therefore an object of this invention to improve foam insulation systems.

A further object of this invention is to automatically control the flow rate at which a resin and a foaming agent are brought together within the mixing chamber of an applicating gun.

A still further object of the present invention is to conserve energy through the manufacture and application of high quality insulation.

Another object of the present invention is to accurately control the temperatures of a resin and a foaming agent at the time the two materials are mixed together to form a foam insulation.

Yet another object of the present invention is to automatically compensate a foam insulation system for drastic changes in wall cavity temperatures to prevent the manufacture of unacceptable insulation.

A still further object of the present invention is to provide a foam insulation system that will allow high quality insulation to be efficiently applied in a minimum amount of time.

Another object of the present invention is to eliminate the need for high quality expensive pumps in a foam insulation system.

These and other objects of the present invention are attained by means of a system including a temperature control section for automatically maintaining the materials at a predetermined mixing temperature, a flow control section for automatically maintaining the flow rates of the materials brought together in the mixture within desired limits for proper blending, and a temperature sensing means for monitoring receiving cavity temperatures and overriding the temperature control means when the temperature of the cavity changes drastically.

BRIEF DESCRIPTION OF THE DRAWINGS

For a better understanding of these and other objects of the present invention, reference is had to the following detailed description of the invention to be read in conjunction with the following drawings, wherein:

FIG. 3 is a circuit diagram of the flow metering circuit used in the flow control section of FIG. 2;

DESCRIPTION OF THE INVENTION

Figure 1:
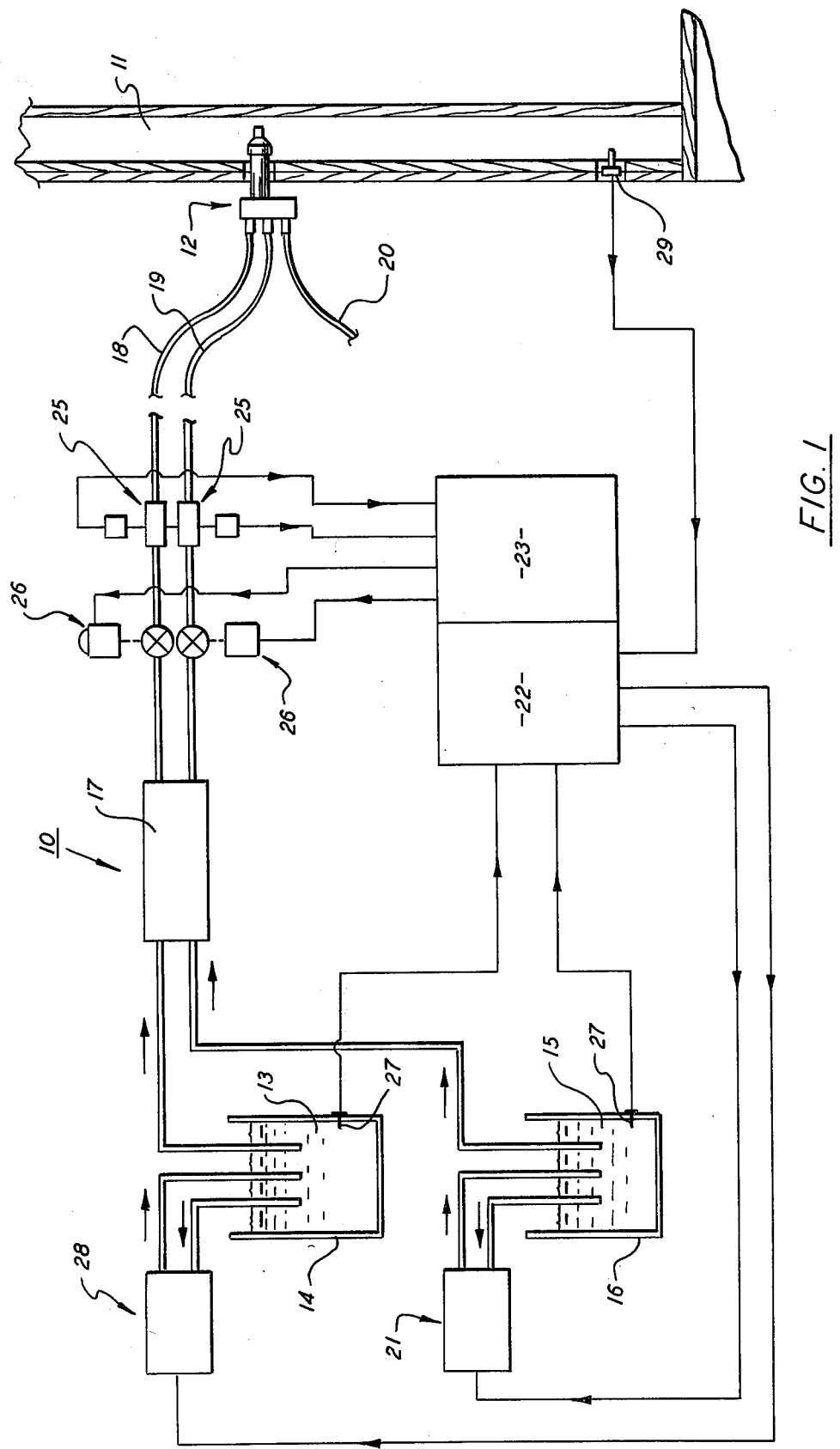
FIG. 1 is a schematic representation of a system for controlling the application of foam insulation materials embodying the teachings of the present invention.

Referring initially to FIG. 1, there is shown a foam insulation system, generally referenced 10, for injecting a foam insulation material into a receiving region, such as wall cavity 11. As is well known, the foam is manufactured by bringing together a resin and foaming agent within the mixing chamber of a gun 12. The resin 13 is stored in a first reservoir 14 while the foaming agent 15 is stored in a second reservoir 16. The materials are drawn from their respective reservoirs by means of a pump set 17 which moves the materials under pressure via flexible hoses 18 and 19 into the gun. In practice, the hoses are relatively long and provide sufficient flexibility to permit the gun to be easily moved from place to place. Typically, the mixture discharged from the gun has the consistency of a rich shaving cream that is capable of rapidly filling the wall cavity. As required, compressed air may be brought to the gun via line 20 and added to the mixture.

In the present system, both the temperature of the materials and the rate of flow maintained in the flexible hoses are automatically controlled to insure that high quality insulation is manufactured. The system is therefore provided with two independent control sections for carrying out the desired functions and includes temperature control section 22 and flow control section 23.

As schematically illustrated in FIG. 1, a turbine flow sender 25 is operatively connected into each of the flow lines downstream of the pump discharge and, as is well known in the art, arranged to send a steady stream of flow information to flow control section 23. The provided flow data is processed in the controller and an output signal generated which is used to position a pair of motorized control valves 26—26 located in the lines between the discharge of the pump and the turbine sender.

On the temperature control side of the system, a pair of temperature probes 27—27 are placed in thermal communication with the materials stored in the reservoirs and send temperature information to temperature controller 22. Here again the data is processed and an output signal produced which will cause each of the materials, when necessary, to by cycled through a heat exchanger unit 21 and unit 28 wherein the material is either heated or cooled. A third temperature probe 29 is also inserted into the wall cavity to monitor the temperature therein. As will be explained in greater detail below, this information is again sent to the temperature controller and is used to override the temperature control system when the cavity temperature exceeds acceptable limits.

Figure 2:
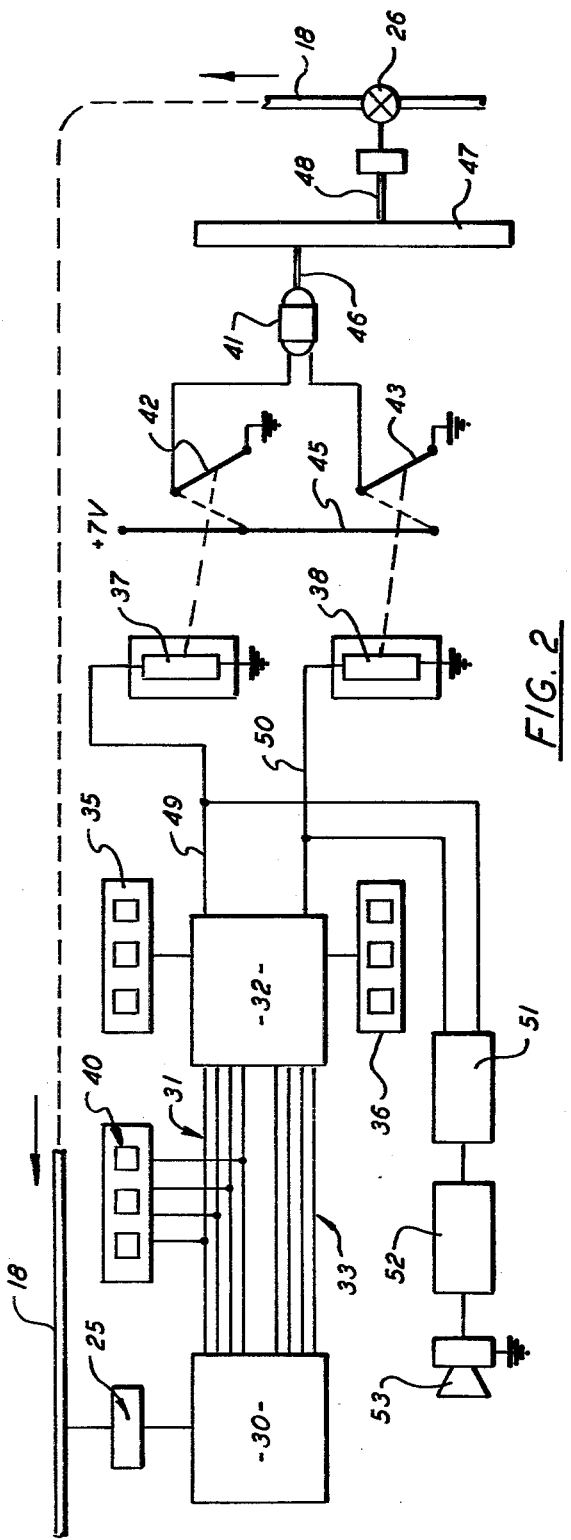
FIG. 2 is a block diagram illustrating the flow control section for one of the materials making up the foam insulation.

The resin flow control circuit and the foaming agent flow control circuit are identical in structure and in function and consequently only one will be described in greater detail herein. FIG. 2 depicts the resin flow control circuit in block diagram. As the material moves along line 18 under the influence of the pump, its volume rate of flow is picked up by the turbine flow sender 25 and a steady stream of pulses indicative of the flow are sent to flow metering unit 30. A BCD count of the incoming pulses is generated in the unit which is passed via a four line data buss 31 to a limit detector 32 for storage. A series of control signals are also generated in the metering unit 30 and sent over control lines 33 to the limit detector 32. The count stored in the detector is compared to an upper limit set into the detector by upper limit thumbwheel switch unit 35 and a lower limit similarly set in by lower limit thumbwheel switch unit 36. When the selected upper limit is exceeded, a first current sensitive relay 37 is energized. On the other hand, when the selected lower limit is not met a second relay 38 is energized. A digital read-out unit (DVM) 40 is wired into the buss and provides an instantaneous readout of the monitored flow at any given time.

The two relays 37,38 electrically control the activity of a small reversible DC motor 41 via contact switch arms 42,43. Normally, when both relays are deenergized, both arms are placed at electrical ground, as illustrated. Energization of relay 37 will cause arm 42 to be pulled into contact with a 7 volt buss 45 whereby the motor is caused to turn in a first direction. Energization of relay 38 will pull arm 43 against the buss causing the motor to turn in the opposite direction.

The drive shaft 46 of the motor is used to drive a gear box 47 whose output shaft 48 is, in turn, adapted to turn the motorized valve 26. Accordingly, when the selected upper limit is exceeded the motor is caused to move the valve toward a closed position thereby restricting the flow in the line 18. Similarly, when the lower limit is exceeded the motor further opens the valve to increase the rate of flow.

An alarm circuit is also provided for generating an audio signal in the event either limit is exceeded for a prescribed period of time. The output lines 49,50 from the limit detector are connected to a time delay 51. If a limit signal remains on either of the output lines for longer than the prescribed period, the delay will cause a latch to be made in horn driver 52 causing the horn 53 to be actuated. This warning signal alerts the user that the system cannot correct the flow rate and indicates that the system should be shut down until the cause of this unwanted situation can be found and corrected.

The flow meter circuit 30 is shown in greater detail in FIG. 3. In practice the turbine flow sender can be of the type supplied by Flow Tech as Model number SFJ-375 which provides a sine wave output indicative of the rate of flow sensed. The output of the sender is applied to the base of a transistor 55 whereby the amplitude of the sender signal is increased to TTL levels. The amplified signal is then applied to a Schmitt trigger 56 whereby the sine wave form is changed to a square wave output pulse. The trigger further serves to reduce the unwanted effects of random noise by means of its built in hysteresis effects.

The pulses from the trigger are passed through a gate 57 into a cascaded decade counter made up of a hundredth counter 58, a tenths counter 59 and a unit counter 60. Gate 57 is enabled upon receipt of a P-CNT signal generated in the system clock 61.

The clock signals are developed by an astable multivibrator 63 to provide a positive P-CLK signal. The positive signal is passed through an inverter 62 to also provide a second negative going N-CLK signal. The positive clock pulse is applied to a pair of series coupled decade counters to produce a negated divide by 100 output noted as N-CNT. This signal is also inverted by inverter 66 to produce a positive P-CNT signal.

The accumulated count in the decade counters is passed on to a series of latches 68,69,70 where the count is stored. After passing on the count, the counters are reset and new count is initiated. The shifting of the latches and the resetting of the counters is controlled by means of a control circuit 71 which includes two D-type edge trigger flip flops 72 and 73.

Upon the generation of a negative count pulse in the clock 61, the first flip flop is triggered allowing the next positive going clock pulse to pass. The pulse is inverted and applied to the latches to set the count. This occurrence also triggers flip flop 73 which in turn enables gate 77. Accordingly upon the occurrence of the next negative going clock pulse the counters are reset and the state of flip flop 72 changed preparatory to beginning a new counting cycle.

The BCD count in hundredths, tenths and units stored in the latches is sent to a multiplexer 78. From the multiplexer the data is multiplexed onto the data buss lines 31 via a tri-state buffers network.

Three control signals DS-1, DS-2 and DS-3 are employed to provide an indication as to whether the hundredths, tenths or units data is on the data buss lines. The control signals are generated by means of a control signal generator 79 including a BCD-to-decimal decoder 80 acting in conjunction with a decade counter 81. The counter is employed as an asynchronous BCD generator in the circuit and serves to feed the noted control signal onto the control lines 33.

Figure 5:
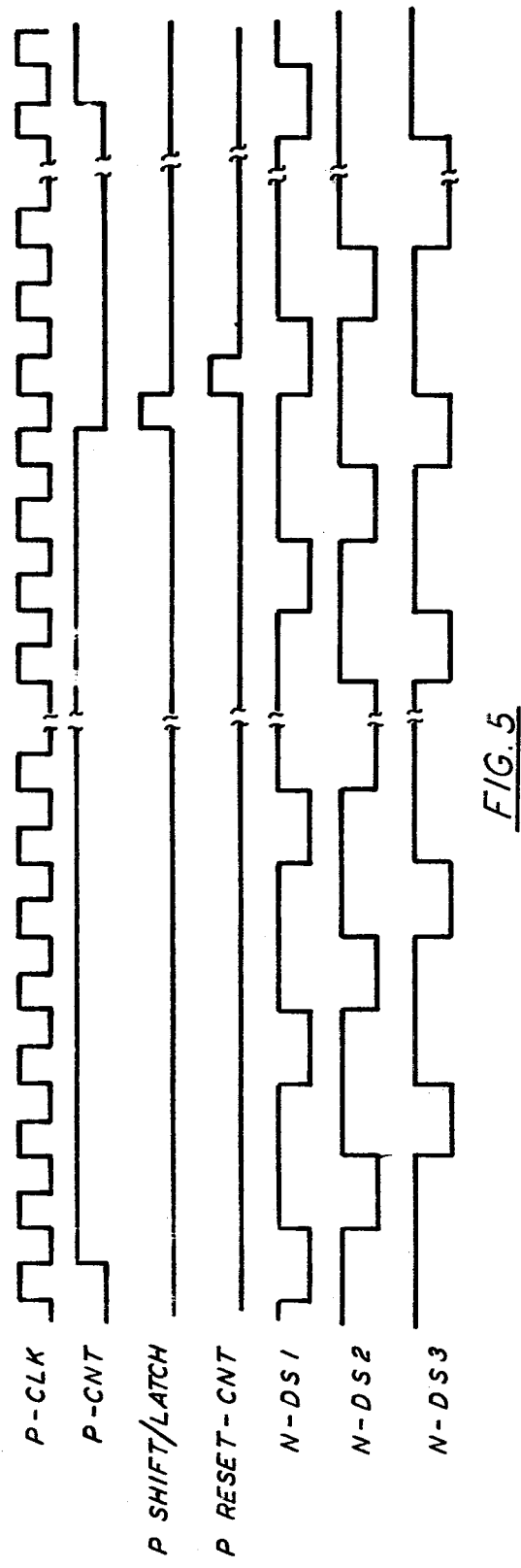
FIG. 5 is a timing diagram showing the relationship between the various operations carried out by the flow control section.

With reference to the timing diagram illustrated in FIG. 5, it can be seen that the main clock puts out a steady stream of positive clock pulses of 0.005 second duration. By means of the two divided by ten decade counters, a positive count pulse having a 0.5 second pulse duration is developed. While the positive count pulse is true the counters continue to accumulate data from the flow sender. Upon the P-CNT signal going false, the accumulated count is passed to the latches and stored by passing the next positive clock pulse through enabled gate 75. As noted above, gate 77 is now enabled and passes the next positive going clock pulse to reset the counters so that a new flow sampling period may be initiated on the next positive going clock pulse.

The positive clock pulses are also applied to the input of the control signal generator 79. The control signals are clocked out of the generator upon receipt of each positive clock pulse. In practice, data buss 31 is a unidirectional system that is adapted to send the multiplexed data to a 7 segment decoder 83 which, in turn, drives three LEDs, 84–86 in the digital display unit 40. A digit selector 87 is arranged to fire a selected transistor associated with each of the LEDs to sequence the diodes in response to the specific digit being multiplexed onto the buss. The selector in effect enables the proper LED on receipt of a signal from the P-CLK pulse. The sequence of the LEDs is rapid enough to permit a three digit number, representative of the sensed flow, to be displayed in the readout windows of unit 40 without disturbing the viewer.

Figure 4:
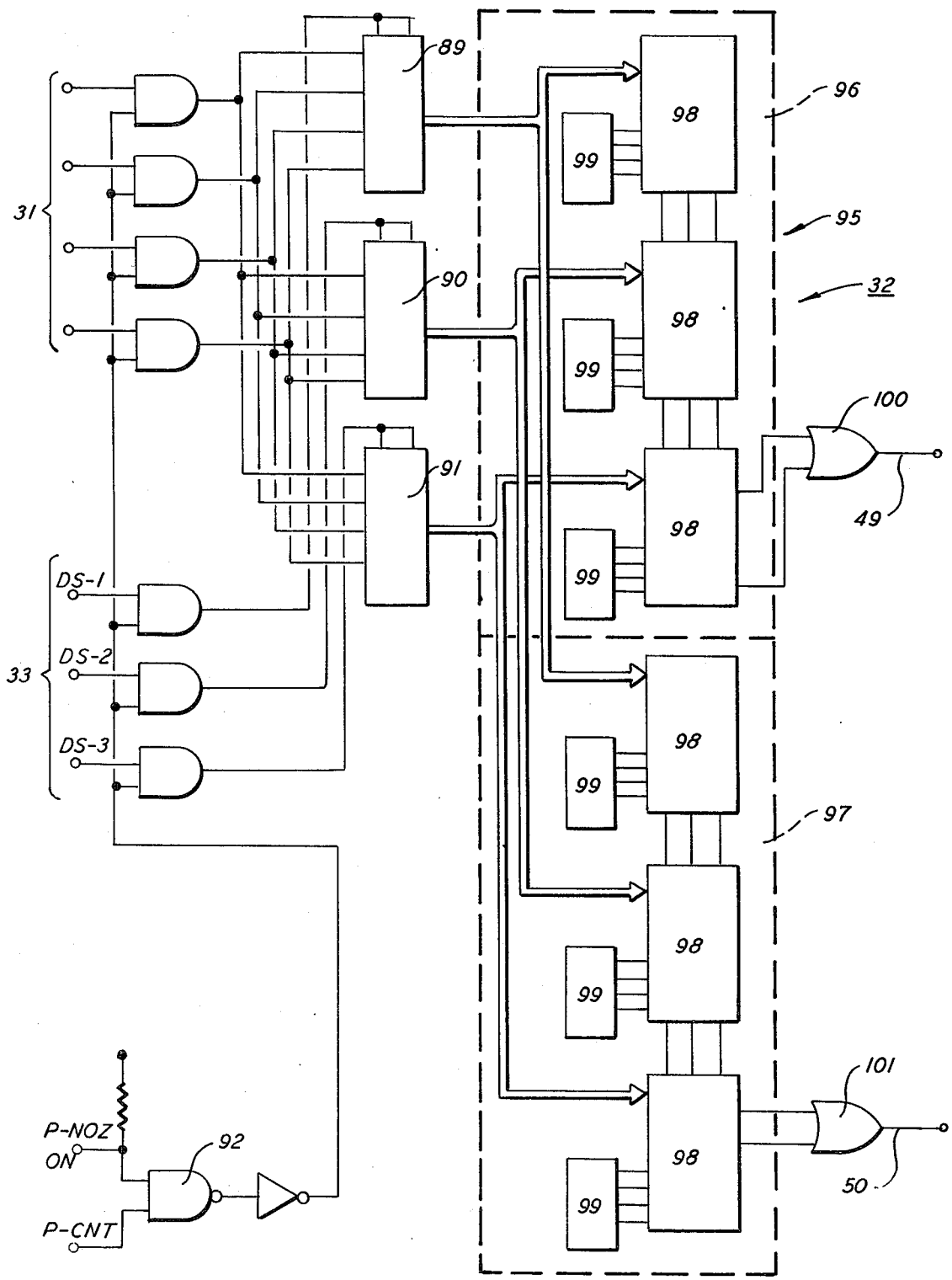
FIG. 4 is also a circuit diagram showing limit detector circuitry associated with the flow control section of FIG. 2.

As seen in FIG. 2, the information on the buss lines 31 and the control lines 33 are applied to a flow limit detector 32. The circuitry of the limit detector is shown in greater detail in FIG. 4. The multipleded BCD data and the control signals are gated into three receiving latches 89–91 through a series of AND gates. The main control gate 92 is enabled by the applicator closing the trigger of the gun to start a flow of material. This permits the next P-CNT pulse to pass through the gate. This enables the remaining gates and allows the data to be loaded into the latches. The data is loaded into the latches using the DS-1, DS-2 and DS-3 pulses to strobe the hundredths, tenths and units data, respectively, from the flow meter circuit into the corresponding latches.

The outputs of the latches are fed into a comparitor 95 having an upper limit section 96 and a lower limit section 97, each of which contains three magnitude comparitors 98 of similar construction. Here the flow rate numbers contained in the latches are compared to an upper limit set into section 96 via three thumbwheel switches 99 and a lower limit set into the lower section by three other thumbwheel switches.

In the event the data provided by the latches exceeds the upper limit selected, a true signal is applied to gate 100 which is passed to the motor control relay 37 (FIG. 2). The relay is energized and the valve is repositioned as noted above. By the same token, when the lower limit selected is not exceeded, gate 101 is enabled and an energizing signal is sent to relay 38. Here again, this action causes the motorized valve to be turned in a direction to increase the flow through the line. If the flow rate cannot be brought to a desired level within ten seconds, the audio alarm will sound.

Figure 6:
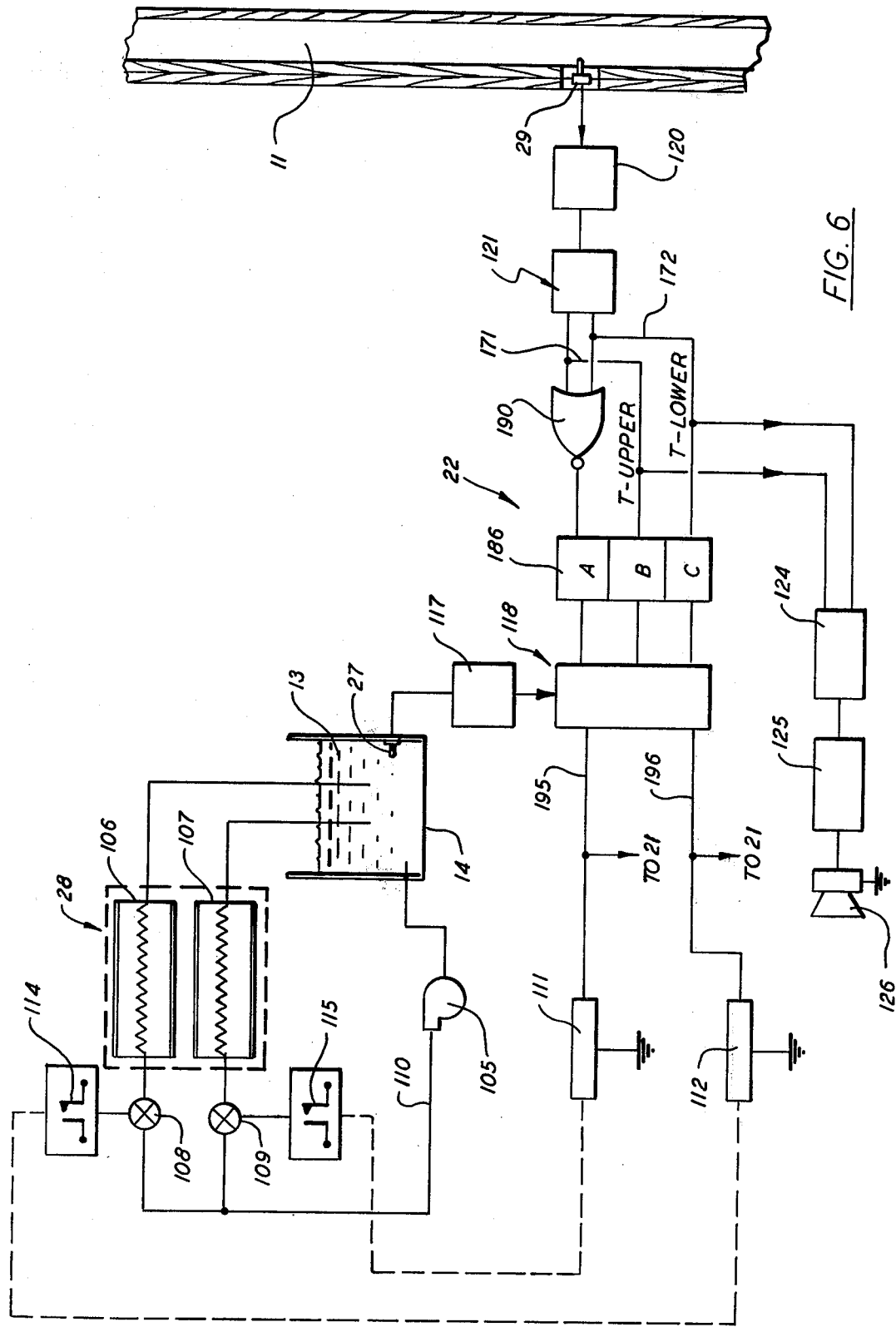
FIG. 6 is a block diagram of the temperature control section of the apparatus illustrated in FIG. 1.

The temperature control side of the present system will be explained with reference to FIGS. 6–9. As noted above, each of the supply reservoirs contains a heat exchanger for either heating or cooling the respective material. With reference to FIG. 6, the resin supply reservoir 14 is shown connected to a circulating pump 105 which is adapted to move the material through either a chiller 106 or a heater 107 in response to two electrically controlled valves 108,109 located in the discharge line 110 of the pump. Opening and closing of the valves is regulated by means of high temperature control relay 111 and low temperature control relay 112 which act in conjunction with contacts 114 and 115 in the valve units.

A temperature probe 27 is inserted into the reservoir and provides accurate temperature information concerning the material 13 contained therein. The temperature information is converted to a voltage signal in the temperature meter circuit 117 and passed on to a comparitor circuit where it is compared to a selected upper and lower temperature limit. If the temperature is too high, relay 112 is energized opening valve 108 whereupon the material is caused to circulate through the chiller until such time as it is brought back into the desired range. On the other hand, if the sensed temperature is too low, relay 111 is energized opening valve 109 and thereby circulating the material through heater 107 until the desired temperature is reached. The circulating pump 105 may be operated in response to the energization of either relay by any suitable circuit means.

As noted above, the insulation materials are usually prepared based on the expected air temperature at the time of application. However, the air temperature usually fails to meet expectations or changes during the course of the application period thereby adversely affecting material temperatures. Of considerable importance during preparation is the concentration of acid that is added to the foaming agent. For any given acid concentration, there exists an optimum material temperature for producing high quality foam. As can be seen, by use of the present system, the materials are rendered insensitive to ambient air temperatures thus insuring that the mixture brought into the cavity will gel properly by the applicator simply placing the recommended upper and lower temperature limits into the comparitor unit.

There are, however, occasions when the temperature of the wall cavity may change dramatically during the application period. This may be caused by many factors, the most prevalent of which is excessive sun loading. If the cavity temperature changes drastically in relation to the selected material temperature, a secondary or backup temperature controller will take over and modify the temperature of the materials to insure that a proper gel time is maintained.

If the cavity temperature rises, the material temperature must be lowered to maintain the optimum gel time for the prepared materials. Similarly, if the cavity temperature falls, the material temperatures must be increased to hold the gel time within the desired optimum range for preparing quality insulation having a consistent R value. It should also be noted that injecting a mixture at one temperature into a cavity at a much different temperature can also produce a shock condition which again may cause material breakdown which again leads to an unacceptable product.

In the present system, the wall cavity temperature may be continually monitored by a probe 29, which feeds information to a temperature meter unit 120 where it is converted to a voltage signal. The temperature information is then sent to a limit detector 121 where it is compared with preselected upper and lower limits. If the limits are exceeded, a signal is generated which is passed to the appropriate comparitor in the resin and foaming agent temperature controller circuit 118 whose function will be described in greater detail below. If either of the wall cavity temperature limits are exceeded, a signal is applied to an alarm circuit made up of a delay 124, a driver 125 and a horn 126. In the event the sensed temperature remains outside of the selected limits for a given period of time, the driver latch is made activating the horn and thus warning the applicator of this potentially harmful condition.

Figure 7:
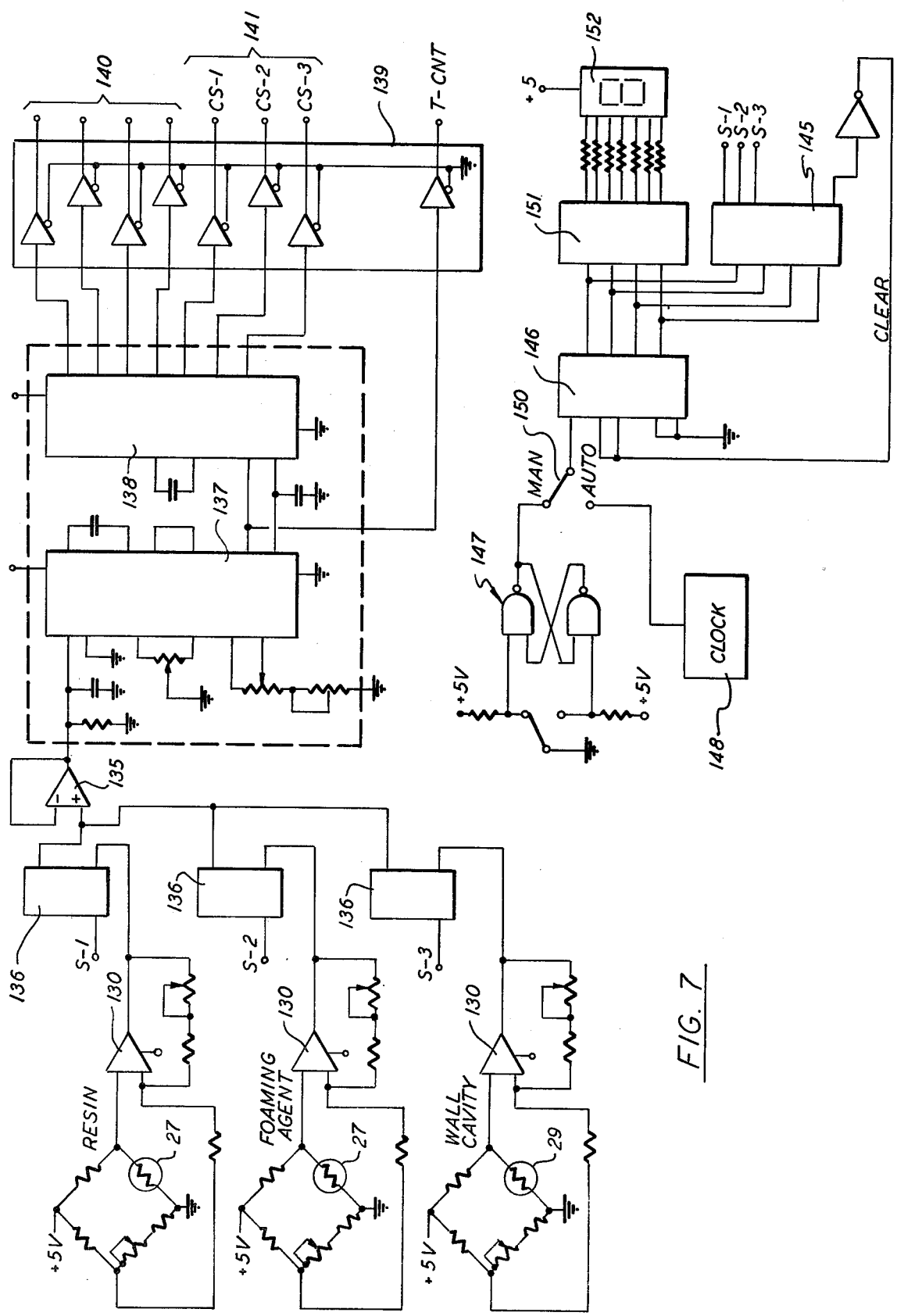
FIG. 7 is a circuit diagram showing the temperature meter circuitry utilized in the temperature controls section of FIG. 6.

In FIG. 7, the temperature meter board circuit of the controller is shown in detail. A positive coefficient nickel film temperature sensitive resistor is placed in a bridge network to transform the temperature sensed into a voltage signal. In practice there is a bridge provided for measuring the resin, foaming agent and wall cavity temperatures. The output from each bridge is applied to an adjustable gain operational amplifier 130—130. The gain of the amplifier is adjusted to transform the bridge offset voltage into a voltage signal having an equivalent of 0.01 volts for each F° of temperature change. The output of each amplifier is multiplexed into a high impedance buffer 135 via three opto-isolators 136.

From the buffer, the data is then fed into a pair of LS1 chips 137,138 which function as a digital DC voltmeter (DVM). The outputs from the DVM are applied to a tri-state buffer 139 adapted to increase the drive current of the signals. The buffered output contains four lines of BCD data 140, three control lines 141, and a T-CNT output indicating a valid signal. Although not shown, a seven segment display can be connected to the data buss 140 to provide a visual readout of the temperature measured.

The temperature input multiplexer is controlled by a BCD to decimal decoder 145 used in conjunction with a decade counter 146 to generate triggering signals S1,S2,S3 for enabling the opto-isolators in an ordered sequence. The counter may be triggered manually by means of a momentary contact switch 147 or by a clock 148 via positionable contact 150. Data output from the decade counter 146 is also applied to a 7 segment readout 151 which provides a visual display 152 of which temperature sensor is being interrogated.

Figure 8:
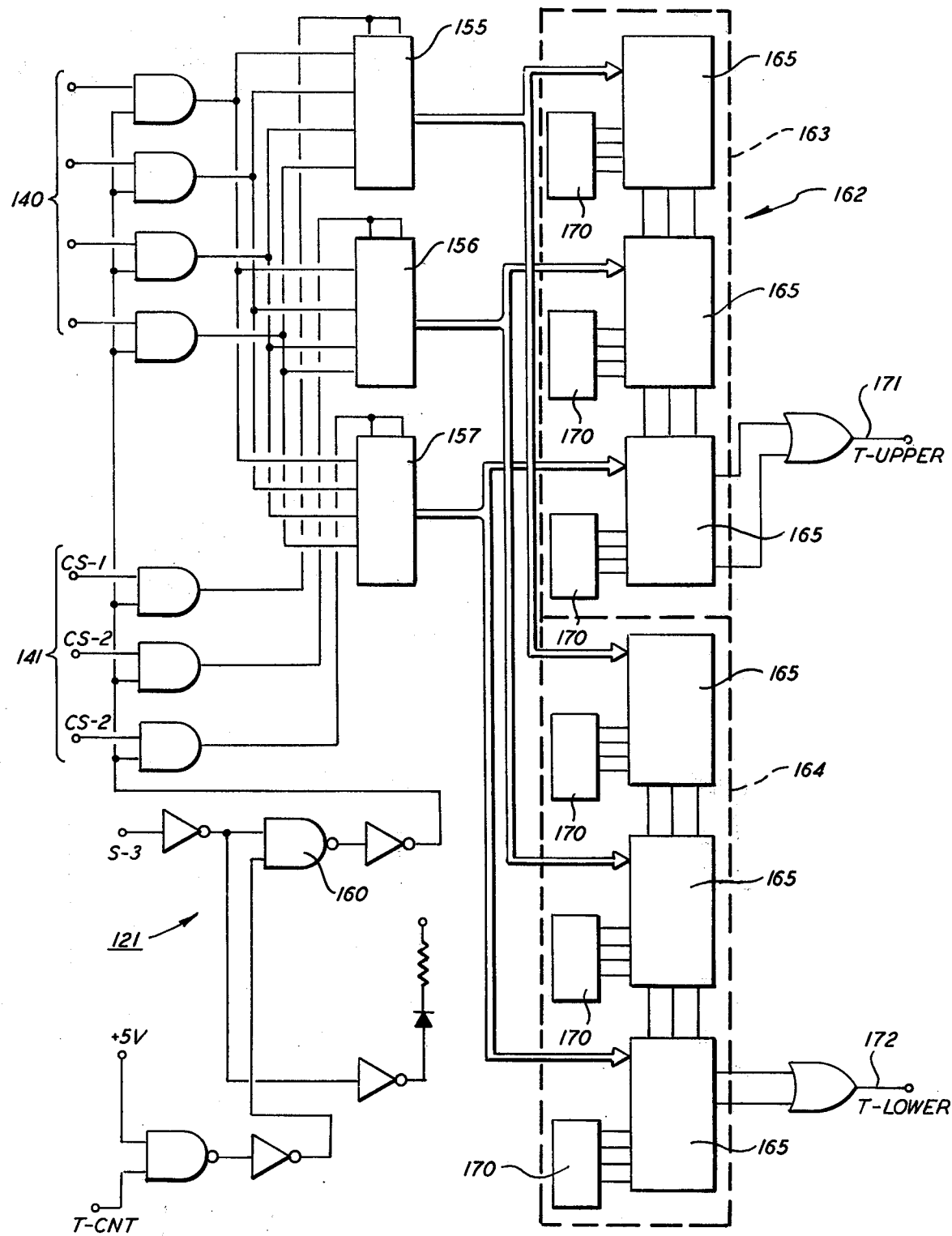
FIG. 8 is a limit detector circuit for use in conjunction with the cavity temperature sensor circuit shown in FIG. 7.

Turning now to FIG. 8, the multiplexed BCD data on data lines 140 (FIG. 7) and the control signals on lines 141 of the meter unit are gated into three latches 155,156,157 of the wall cavity limit detector 121. To enable the gates, a first T-CNT signal from the tri-state buffer must be applied to main control gate 160. Once enabled, the system waits for a signal S-3 from the wall cavity multiplexer indicating that the wall cavity measuring system is now being interrogated. An enabling signal is then passed to the other gates permitting data to be loaded into the latches using the three control signals to strobe the ones, tens and hundreds data into latches 157,156 and 155, respectively.

The output of the latches is fed into a comparator unit 162 having an upper temperature limit section 163 and a lower temperature section 164. Each section contains three magnitude comparitors 165 arranged to compare the sensed wall cavity temperature contained in the latches with a first upper limit placed in section 163 and a second lower limit placed in section 164 using the two sets of thumbwheels 170.

If the cavity temperature is greater than that selected in the upper limit section of the unit, a T-UPPER signal is applied to line 171. Conversely if the selected temperature placed in the lower limit section is not exceeded, a second T-LOWER signal is placed on line 172. If either of the signals appear on the lines, the generated signal is fed back to the resin and foaming agent controller 118 where it is used to change the controller limits and thus assure a constant gel time is maintained.

Figure 9:
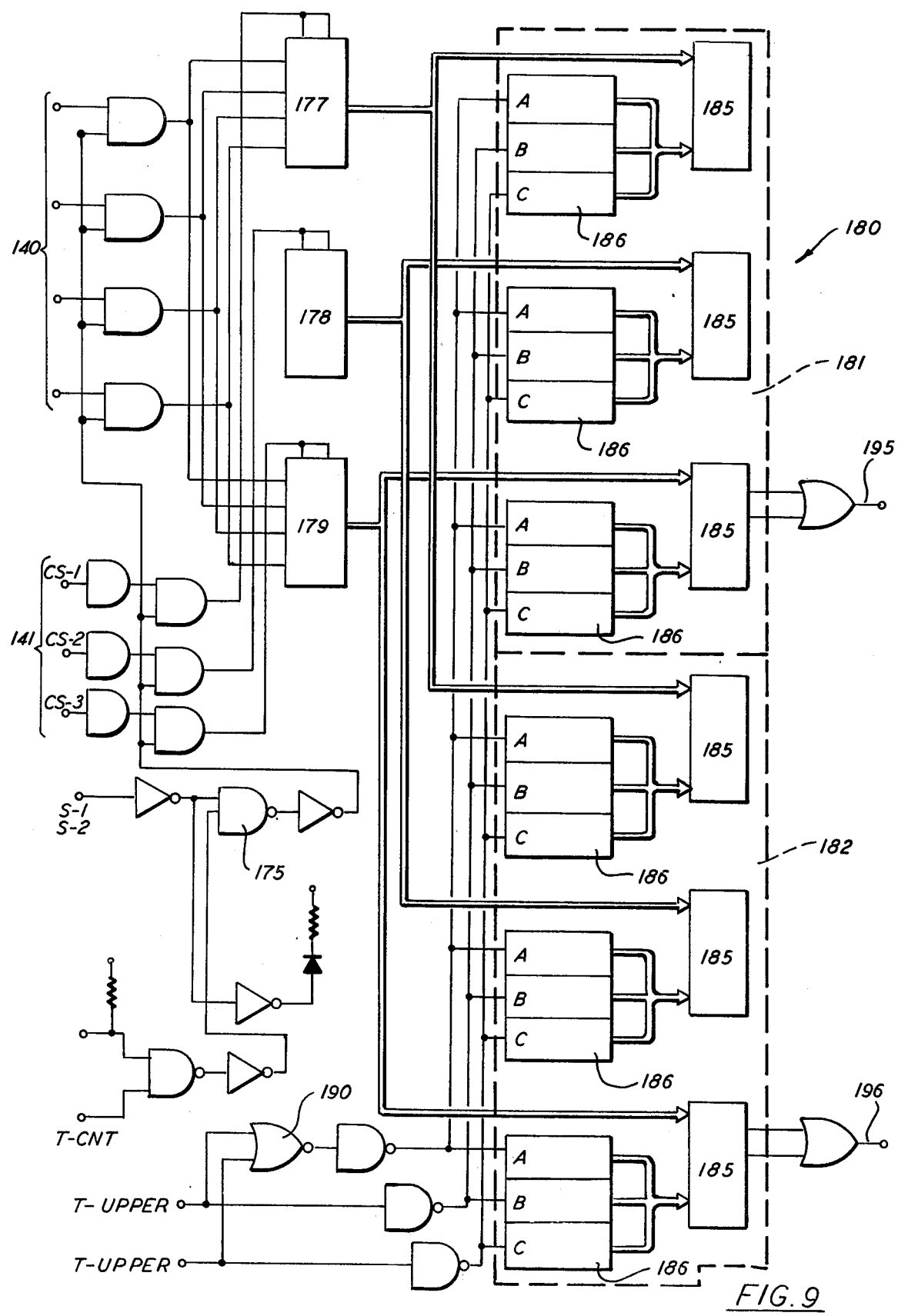
FIG. 9 is a comparitor circuit used with the resin and foaming agent temperature sensor circuit shown in FIG. 7.

Referring now to FIG. 9, there is shown in greater detail the resin and foaming agent temperature controller circuit 118. The multiplexed BCD data lines 140 and control signal lines 141 are connected to a series of input gates. The gates are enabled when either the resin or the foaming agent temperature meter multiplexer is being interrogated. At this time a T-CNT signal is applied to control gate 175 thereby enabling the gate. Upon receipt of a signal from either the resin or foaming agent multiplexer at gate 175, the signal is passed to the other gates which are also enabled. This, in turn, permits the BCD temperature data and the control signals to pass into the latches 177,178 and 179. The control signals CS-1, CS-2 and CS-3 are used to strobe the ones, tens and hundreds data from the buss causing the information to be loaded into the latches.

The output from the latches is then fed into the main temperature comparitor 180 which again includes an upper limit section 181 and a lower limit section 182. Each section contains three magnitude comparitors 185 of similar construction which allow comparison of the incoming data with selected information contained in three channel selectors 186. Channel A in each section includes three thumbwheel switches which allow the operator to set in the desired upper and lower temperature limits for the particular material being processed. Channel B also includes thumbwheel switches which permit an upper wall cavity temperature limit to be programmed into the comparitor while the third channel C similarly permits the lower wall cavity temperature limit to be programmed into the system.

When the temperature of the wall cavity is within allowable limits, a signal is passed through gate 190 thereby enabling the A channel of the selector. In the event the wall cavity temperature exceeds the upper limit set into the wall cavity limit detector 121, gate 190 is disabled and channel B of the selector is activated. On the other hand, if the wall cavity temperature falls below the limit detector's lower value, the C channel will be activated. As explained above, under normal conditions, the material temperature will be held within the limits dictated by the A channel selection. However, in the event the wall cavity temperature undergoes a dramatic change, the system will automatically take over and compensate for the change by raising or lowering the material temperatures to maintain the desired gel time and thus produce an insulation having a constant R value.

The upper limit signal generated in the comparitor is passed along line 195 to the resin and foaming agent temperature regulating systems to provide for cooling while line 196 will send a signal wherein heating of the materials will be provided for as explained above.

While this invention has been described with reference to the structure disclosed herein, it is not confined to the details set forth and this application is intended to cover such modifications or changes that may come within the scope of the following claims.

We claim:

1. The method of controlling the application of a foam insulation wherein a resin and a foaming agent are pumped through separate lines into a mixing chamber and the mixture injected into a receiving area, the method including the steps of automatically adjusting the rate of flow passing through each line to compensate for changes in said flow whereby the resin and foaming agent are continually moved into the mixing chamber in the same proportions, maintaining the temperature of the resin and foaming agent at a constant level, monitoring the air temperature in the receiving area, and automatically changing the temperature of the resin and foaming agent in the event the air temperature moves outside of a desired range.

2. In an apparatus for controlling the application of a foam insulation of the type wherein a resin and a foaming agent are pumped through independent flow systems from separate reservoirs into a mixing chamber, each flow system including a heat exchanger having a heater section and a chiller section operatively connected to the reservoir, circulating means for circulating fluid from the reservoir through the heat exchanger and then back to the reservoir, temperature means for sensing the temperature of the fluid prior to its being pumped into the mixing chamber and generating an electrical output signal indicative of the temperature sensed, comparator means for receiving the temperature signal and comparing it with selected upper and lower temperature limits, said comparator being adapted to generate a control signal when the compared limits are exceeded, and electrical control valve means connected to the heat exchanger means and regulated by the control signal from said comparator means to automatically pass the fluid through either the heater or the chiller in order to maintain the fluid temperature within the selected range.

3. The system of claim 2 further including a temperature probe arranged to sense the air temperature in a cavity and producing an electrical signal indicative of the air temperature, a second comparator means for comparing the sensed air temperature with preselected upper and lower limits and generating an output signal indicative of whether the ambient temperature is above or below said limits, and alarm means responsive to the output signal for actuating an alarm in the event said second comparator limits are exceeded.

4. The system of claim 3 further including a selector operatively associated with said first comparator for programming a plurality of upper and lower limits into said comparator and gating means responsive to the output of said second comparator for changing the selected upper and lower limits of said first comparator when the upper and lower limits of said second comparator are exceeded.

5. In a device wherein fluid resin and foaming agent are brought together with a compressed gas within the mixing chamber of a gun to produce a foam insulation, apparatus for controlling the flow of said fluids to the mixing chamber including a pair of flow conduits for bringing each of said fluids to the mixing chamber, one for each fluid, sensing means in each of the conduits for sensing the rate of flow passing therethrough and generating a rate signal indicative of said flow rate, comparator means operatively connected to each sensing means for receiving the rate signals and comparing each to an upper rate limit and a lower rate limit, means for producing a first control signal in the event the rate signal exceeds the comparator's upper limit and a second control signal in the event the rate signal falls below the comparator's lower limit and a motor driven control valve positioned in each flow conduit having a reversible motor that is responsive to the signal output of the relay means to move the valve toward a closed position when a first control signal is generated and toward an open position when a second control signal is generated.

6. The apparatus of claim 5 that further includes an alarm means for generating a discernible signal in the event one of the rate signals remains outside the upper and lower limits for a predetermined period of time.

7. The apparatus of claim 5 wherein said comparator means further includes programmable means for manually setting the upper and the lower limits therein.

8. The apparatus of claim 5 wherein the sensing means is positioned in the flow conduit between the control valve and the mixing chamber.

9. The apparatus of claim 5 wherein said sensing means includes a turbine flow sender for generating a stream of output pulses in response to the rate of flow passing through the conduit, storage means for counting the output pulses generated by said sender and enabling means for periodically passing the stored count to said comparator means.

* * * * *